United States Patent [19]

Hasegawa

[11] Patent Number: 4,807,092
[45] Date of Patent: Feb. 21, 1989

[54] OPTICAL DECORATION SYSTEM

[76] Inventor: Yasuo Hasegawa, c/o Koken Co., Ltd., 215-1, Shimomagari, Ritto-cho, Kurita-gun, Shiga-Pref., Japan

[21] Appl. No.: 69,050

[22] Filed: Jul. 2, 1987

[51] Int. Cl.[4] .............................................. G09F 9/30
[52] U.S. Cl. ...................................... 362/32; 362/812
[58] Field of Search .................. 362/32, 326, 336, 812

[56] References Cited

U.S. PATENT DOCUMENTS

| | | | |
|---|---|---|---|
| 864,387 | 8/1907 | Pfister | 362/326 X |
| 1,351,562 | 8/1920 | Foster | 362/32 |
| 1,810,168 | 6/1931 | Gray | 362/326 X |
| 3,439,157 | 4/1969 | Myles | 362/32 |
| 3,564,233 | 2/1971 | Cox et al. | 362/32 X |
| 4,048,486 | 9/1977 | Kriege | 362/32 |
| 4,141,058 | 2/1979 | Mizohata et al. | 362/32 |
| 4,385,344 | 5/1983 | Gonser | 362/32 |

FOREIGN PATENT DOCUMENTS

| | | | |
|---|---|---|---|
| 2437580 | 11/1975 | Fed. Rep. of Germany | 362/32 |
| 2806076 | 8/1979 | Fed. Rep. of Germany | 362/32 |
| 854701 | 1/1940 | France | 362/336 |
| 120002 | 9/1980 | Japan . | |
| 86801 | 5/1982 | Japan . | |

Primary Examiner—Tony M. Argenbright
Assistant Examiner—Eric R. Carlberg
Attorney, Agent, or Firm—Price, Gess & Ubell

[57] ABSTRACT

An improved optical decorative system in which colored light is conducted via optical fibers from the light source to the back side of the transparent viewing panel. The viewing panel has specified masked patterns on its front side while the back side is covered with transparent granulated matter such as shattered glass, to diffuse the incident light and provide for an even illumination of the unmasked areas.

11 Claims, 1 Drawing Sheet

OPTICAL DECORATION SYSTEM

BACKGROUND OF THE INVENTION

1. Field of the Invention

This invention relates to an optical decoration system having one end of an optical fiber exposed to a light shining source through a filter moving across a given light incidence path, the other end thereof being arranged to emit the rays of light which have been guided through and subjected to color change.

2. Prior Art

Optical decoration systems of this type have been known in, for instance, Patent Official Gazzette 1972 No. 224-77.

The system disclosed in that publication is intended to offer improved optical decoration effect by placing a screen member opposite to the light-discharging charging side of an optical fiber, and allowing the transmitted rays of light to be refracted or scattered onto the screen surface.

However, although this optical decoration system was capable of producing various changes in light, it suffered from the inability to give a uniform light decoration effect on the front surface of the screen.

This inability is attributable to the fact that insufficient light reflection occurs on the screen.

The screens employed in the aforestated system include lenticule screens, halftone contact screens, ruling screens, ground glass screens, and half mirror screens. All of these have low refractive indexes and hence are able to change the rays of light transmitted through a fiber; yet due to strong directivity thereof, the light falling onto the screen is brilliant around the center thereof, but becomes dimmer at the more remote regions.

Therefore, although the light-emitting end portion of an optical fiber is made to converge to a desired letter or pattern, the letter and/or pattern can be seen as a collection of dots, thereby making unclear the fine portions, radii and deflected portions of the letter and/or pattern. If the specified letter or logomark is to be optically displayed correctly, a multitude of fibers which are bound closely together must be used.

SUMMARY OF THE INVENTION

The object of this invention is to use a limited number of fibers to throw light uniformly all over the screen surface, in an optical decoration system wherein the one end of an optical fiber is exposed to a light source shining through a filter which moves across a particular light incidence path, and the other end thereof being arranged to emit the rays of light which have been guided through and subjected to color alterations.

The technical means to achieve the aforestated objective is by (a) placing a transparent panel on which letters and/or patterns are formed through masking, at a distance in the forward position of the light-emitting end portion of an optical fiber, and (b) adhering transparent particulate matters to the inside of the light transmission portion of the panel.

The optical decoration surface is formed by providing masking for an optical panel located in front of the light-discharging end portion of an optical fiber to make up letters and/or patterns. Optical decoration effect is achieved by constructing an optical decoration surface of both the portion through which the rays of light guided through the optical fiber is transmitted and the portion at which they are cut off by the masking.

The rays of light through the light-transmitting portion of the panel are subjected to irregular reflection, and hence lose the directivity thereof, preventing them from being thrown in a dotted form onto the panel surface.

Accordingly, it becomes possible to cast the rays of light, through the optical fiber, uniformly all over the optical decoration surface, even though the light-emitting end portions of the optical fibers are placed sparsely.

The light decoration system can present the letters and/or patterns to be optically shown as a single surface and give a clear-cut and correct display of fine letters, patterns and/or logomarks abundant in deflected portions by throwing the rays of light emanated from a light source through a limited number of optical fibers uniformly onto the light decoration surface.

Since the light guided through optical fibers has exceedingly high directivity, when the conventional screen is employed, a sufficient amount of light can be radiated onto the front thereof, but the light is hard to perceive when one sees the screen in angular directions. This disadvantage limits the applicability of the conventional screen in an optical decoration system. The system of this invention, however, successfully suppresses practically all directivities of the rays of light transmitted through fibers, and hence there disappear such directivities on an optical decoration surface. Consequently, the optical decoration systems of this invention, including advertising billboards posted at a higher location, can fully offer optical decoration effect even when seen in angular directions.

Transparent panels in the present invention include, but are not limited to, transparent acrylic resin plates or glass. Not merely colorless, but colored and transparent ones as well may be employed, according to the user's taste or to the application for which the optical system is intended.

Various candidates can be used for the particulate matter of the present invention, but the ones which are granulated and have many cleavage planes are preferred to achieve improved refraction of light by subjecting it to irregular reflection. For this purpose, crushed particles of glass and transparent plastics, and those of optical crystals, including $CaF_2$, $MgF_2$ and $SrF_2$ are in general use.

For the transparent particulate matter, that of grain sizes between approx. 200 and 900$\mu$ is best suited. It is not necessarily required, however, that grain sizes be made uniform, and a mix of different materials can be used.

About 75 percent of the rays of light guided by an optical fiber possess a specific illumination angle of ±20%. This means that the amount of light is sufficient to illuminate a circle area approx. 11 and 14 mm in diameter on the panel surface when the panel is kept 15 to 20 mm away from the light-discharging end portions of the optical fibers. If higher specific illumination s to be attained, the circle that can be illuminated becomes smaller in area. If a light source with higher illuminance capability is used, the optical decoration surface becomes more brilliant even when separated at a greater distance from the light-discharging end portions of the optical fibers.

As has been noted above, the distance between the light-emitting end of an optical fiber and the transparent panel can be determined in terms of the sectional diameter of that fiber, number of fibers, light source illuminance capabilities, desired luminous intensity for optical decoration and other factors, and may also be selected according to the intended application.

- (2) Light source
- (6) Color filter
- (8) Optical fiber
- (10) Optical decoration portion
- (11) Light-emitting end of a fiber
- (12) Metal mesh plate
- (16) Transparent panel
- (17) Masking
- (19) Shattered glass pieces

DETAILED DESCRIPTION OF THE INVENTION

Figure 1:
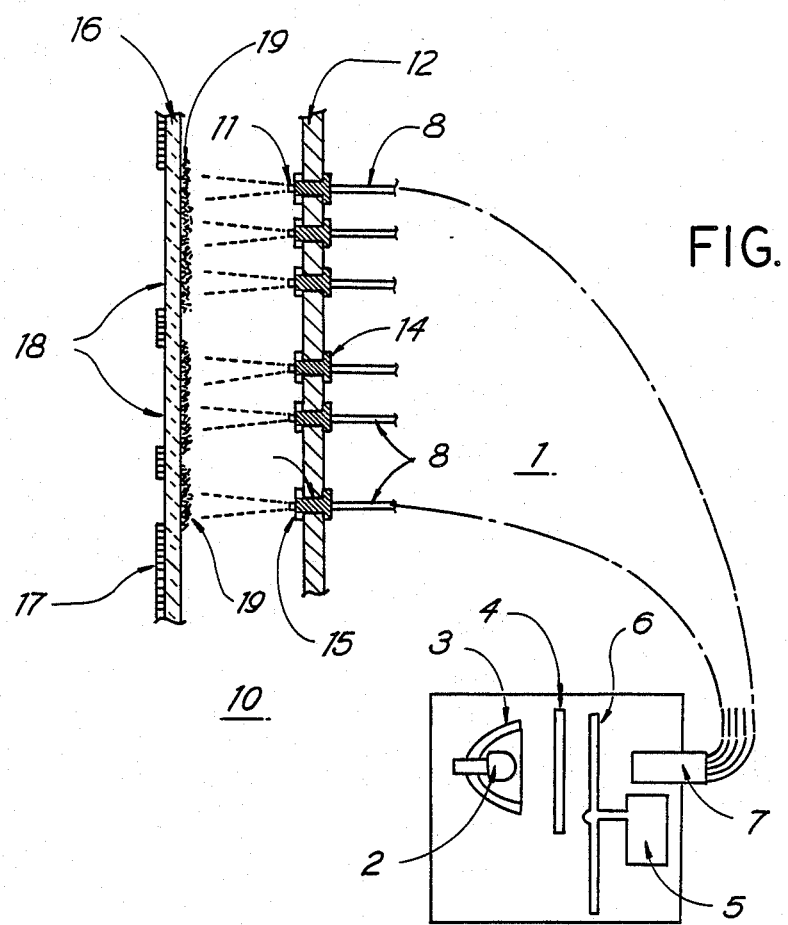
FIG. 1 is a sectional schematic diagram of of an optical decoration system embodying the invention.

Referring now to the drawings, FIG. 1 is a schematic of an optical decoration system (1). The rays of light emanated from a light source (2) are reflected and collected by a reflecting mirror (3) placed behind it. Then, they are passed through a heat absorbing glass (4) where the heat generated by the said light source is absorbed, thereby preventing the optical fibers (8) and light decoration portion to be described later, from becoming damaged due to the heat.

In front of the heat absorbing glass (4), a bundle of optical fibers (8) with the end portions thereof being surely arranged flush, is exposed to the light source (2). Provided between the two is a motor-driven (5) color filter (6) whereby the rays of light deprived of heat are rendered color by a color filter (6) and are allowed to go into the optical fibers (8).

Figure 2:
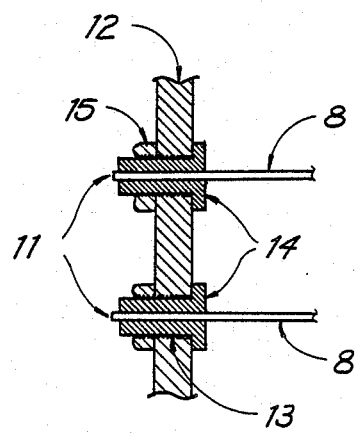
FIG. 2 is an expanded sectional view of the secured light-emitting end portion of a fiber used in said optical decoration system.

In an optical decoration portion (10) there is mounted a metal plate (12) having network of drilled through-holes (13). The light-emitting end portions (11) of optical fibers are secured so that the end surfaces thereof are flush, by inserting, into through-holes at intervals of approx. 10 mm, the light-emitting end portions of optical fibers to which a tubular member (14) having a flange at its rear end and a male thread on the forward end thereof is adhered so as to form the patterns to be displayed, and by screwing a nut (15) onto said forward end (see FIG. 2).

The front surface of the metal plate (12) has a transparent panel (16) mounted parallel thereto at a distance of approx. 20 mm. The front surface of the transparent panel has specified patterns and/or letters formed by masking (17), and the unmasked and hence transparent portion of the panel has the inside covered with shattered glass pieces of a grain size of approx. 700μ attached using adhesive.

The rays of light guided from the light-emitting end portion (11) of an optical fiber advance at a small angle as indicated by the dotted line, are subjected to irregular reflection through a group of shattered glass pieces (19), pass through the through-hole portion (18) of the panel en masse, and illuminate the unmasked portions (17) of the optical decoration surface.

What I claim is:

1. An optical decoration system comprising:
   a source of light;
   a plurality of optical fibers arranged to receive light from the light source at one end of each fiber and to project light at the other end;
   means for mounting at least a portion of the projecting light ends of the fibers at spaced apart locations to project light;
   a substantially transparent panel positioned apart from the ends of the projecting light fibers to receive the projected light on a rear surface of the panel, the panel being positioned sufficiently away from the mounted fiber ends to receive a substantially larger pattern of light than the diameter of the fiber wherein a plurality of pattern of lights are realized on the rear surface, and
   means for diffusing each of the projected incident light patterns on the rear surface to provide a substantially diffused uniform illumination of a front surface of the panel.

2. The invention of claim 1, wherein light from the light source is passed through a color filter before it is conducted away by the optical fibers.

3. The invention of claim 1, wherein the front side of the transparent panel has selectively masked and unmasked areas.

4. The invention of claim 1 wherein the means for diffusing includes transparent particulate matter attached to the panel, each particle of the particulate matter provides refracting interfaces with the light to collectively scatter the incident light patterns.

5. The invention of claim 4 wherein the transparent particulate matter is from 200μ to 900μ in size.

6. The invention of claim 4 wherein the means for mounting includes flanged tubular members attached to the projecting fiber ends, an apertured mounting member positioned approximately 15 to 20 mm from the transparent panel and means for fastening the tubular member to the mounting member.

7. The invention of claim 4 wherein the particulate matter is glass.

8. The invention of claim 5 wherein the refracting particles consist of shattered glass.

9. The invention of claim 8 wherein the particles are from 200μ to 900μ in size.

10. An optical sign system comprising:
    a source of light;
    a plurality of optical fibers arranged to receive light from the light source at one end of each fiber and to project light at the other end;
    means for mounting the projecting light ends of the fibers at spaced apart locations to project light;
    a substantially transparent panel positioned apart from the ends of the projecting light fibers to receive the projected light on a rear surface of the panel, the panel being positioned sufficiently away from the mounted fiber ends to receive a substantially larger pattern of light than the diameter of the fiber wherein a plurality of spaced apart patterns of lights are realized on the rear surface;
    means for diffusing each of the projected incident light patterns on the rear surface to provide a substantially diffused uniform illumination of a front surface of the panel, including refracting particles attached to the rear surface of the panel for receiving the spaced apart patterns of light, and
    means for masking the front surface of the panel to provide decoration indicia.

11. An optical decoration system comprising:

a source of light;

a plurality of optical fibers arranged to receive light from the light source at one end of each fiber and to project light at the other end;

means for mounting at least a portion of the projecting light ends of the fibers at spaced apart locations to project light, including flanged hollow tubular members for receiving alight projecting fiber end, a mounting member with corresponding apertures to receive the tubular members and means for fastening the tubular members to the mounting member;

a substantially transparent panel positioned apart from the ends of the projecting light fibers to receive the projected light on a rear surface of the panel, the panel being positioned sufficiently away from the mounted fiber ends to receive a substantially larger pattern of light than the diameter of the fiber wherein a plurality of pattern of lights are realized on the rear surface, and means for diffusing each of the projected incident light patterns on the rear surface to provide a substantially diffused uniform illumination of a front surface of the panel.

* * * * *